United States Patent [19]

Cripe et al.

[11] Patent Number: 5,724,769

[45] Date of Patent: Mar. 10, 1998

[54] MOTOR VEHICLE WINDOW CONSTRUCTION WITH PULL-PULL CABLE SYSTEM

[75] Inventors: Todd E. Cripe, Elkhart, Ind.; Darren M. Grumm, Cassopolis, Mich.; Raymond S. Butler, Elkhart, Ind.; Roger E. Schamanek, Rochester Hills; Dennis J. Buening, Waterford, both of Mich.

[73] Assignee: Excell Industries, Inc., Elkhart, Ind.

[21] Appl. No.: 624,130

[22] Filed: Mar. 29, 1996

Related U.S. Application Data

[63] Continuation-in-part of Ser. No. 369,345, Jan. 6, 1995, Pat. No. 5,542,214.

[51] Int. Cl.⁶ ..................................... E05F 11/53
[52] U.S. Cl. ..................... 49/360; 49/352; 49/380; 49/121
[58] Field of Search ........................ 49/331, 332, 347, 49/349, 352, 360, 139, 140, 118, 380, 121

[56] References Cited

U.S. PATENT DOCUMENTS

| | | | |
|---|---|---|---|
| 4,608,778 | 9/1986 | Shiraishi et al. | 49/360 |
| 4,793,099 | 12/1988 | Friese et al. | 49/380 |
| 4,920,698 | 5/1990 | Friese et al. | 49/380 |
| 4,941,286 | 7/1990 | Marscholl et al. | 49/352 |
| 4,970,911 | 11/1990 | Ujihara et al. | 49/352 |
| 5,146,712 | 9/1992 | Hlavaty | 49/118 |
| 5,333,411 | 8/1994 | Tschirschwitz et al. | 49/360 |
| 5,442,880 | 8/1995 | Gipson | 49/380 |
| 5,505,023 | 4/1996 | Gillen et al. | 49/360 |
| 5,531,046 | 7/1996 | Kollar et al. | 49/360 |
| 5,542,214 | 8/1996 | Buening | 49/360 |
| 5,613,323 | 3/1997 | Buening | 49/360 |

Primary Examiner—Jerry Redman
Assistant Examiner—Curtis Cohen
Attorney, Agent, or Firm—Banner & Witcoff, Ltd.

[57] ABSTRACT

A motor vehicle window construction has a pull-pull closed loop cable drive system for opening and closing a glazing pane slidably mounted in a frame. A motor and drive drum apparatus for powered operation of the window construction is mounted to the vehicle body at a location remote from the frame. The cable system includes drive cable wrapped around the drive drum. A first drive cable segment extends laterally from the glazing pane or from a slidably mounted subassembly incorporating the glazing pane, toward one side of the frame member. A second drive cable segment extends from the glazing pane or subassembly toward the opposite side of the frame. The glazing pane and drive cable together form a closed loop from the drive drum. Rotating of the drive drum in a first rotational direction by actuation of the drive motor pulls the slidably mounted transparent pane toward its open position. Rotating the drive drum in the opposite rotational direction pulls the glazing pane toward its closed position. A method also is provided for retrofitting a manual-slide window construction preinstalled in a motor vehicle body to be a powered slide window as just described. A retrofitting kit is provided for carrying out such retrofitting method.

27 Claims, 6 Drawing Sheets

MOTOR VEHICLE WINDOW CONSTRUCTION WITH PULL-PULL CABLE SYSTEM

This application is a continuation-in-part-application of U.S. application No. 08/369,345, filed Jan. 6, 1995 now issued U.S. Pat. No. 5,542,214.

INTRODUCTION

The present invention is directed to a motor vehicle window construction and, more particularly, to a window construction in which a sliding pane is mounted in a frame for lateral sliding back and forth between an open and closed position, powered by novel drive apparatus incorporating a closed loop drive cable arrangement.

BACKGROUND

Motor vehicle window assemblies having one or more laterally sliding panes, that is, panes which slide substantially horizontally in the vertical plane of the pane, may be either manually operated or operated by electric motor. Such window assemblies are used, for example, as rear slider windows for pickup truck cabs, typically having a circumferential (that is, outer peripheral) frame in which are mounted a sliding pane along with one or more fixed panes. The frame may be structural or semi-structural in that it integrates the sliding pane and one or more fixed-position panes as a self-contained preassembled module suitable for shipping and handling during installation into a motor vehicle.

A window assembly for a vehicle having a sliding pane is shown in U.S. Pat. No. 4,850,139 to Tiesler. In the Tiesler design the sliding window is manually operated. No power drive mechanism is suggested. Preassembled multi-pane window constructions are shown in U.S. Pat. No. 4,920,698 to Friese et al. The Friese et al window assemblies are replacements for the OEM (original equipment manufacturer) rear slider window assembly originally included in a vehicle when it was new. The Friese et al window assembly includes right side and left side fixed panes and a sliding center pane powered by an electric motor. The powered sliding truck cab window assembly of Friese et al has an undesirably complex mechanism for delivering drive power from an electric motor for moving the sliding pane between its open and closed positions. It shows, for example, a rack and pinion gear arrangement and, as an alternative, a push/pull drive cable arrangement also is shown. An interior cable cooperates with an outer sheath to chive the sliding pane through the intermediary action of a transmission mechanism which retracts or pushes out the interior cable upon actuation by the drive motor. Such push-pull cable arrangements present limitations as to the force which can be transmitted without buckling the cable. Also, such complex drive arrangements for sliding windows may in certain applications present reliability concerns and increased manufacture, installation and repair costs. It would be highly desirable for meeting increasingly stringent OEM requirements of the major motor vehicle manufacturers to have a reliable, less complex drive system for a powered sliding window assembly, especially a sliding window assembly wherein the sliding pane in its closed position can be flush with adjacent fixed panes.

Designs for motor driven window constructions for a motor vehicle must select an appropriate location for mounting the electric motor and drive drum apparatus to the vehicle body. Present designs typically locate the electric motor proximate the window frame. It is now seen to be advantageous to mount the electric motor and drive drum apparatus, with its relatively high mass and rigidity, at a lower location in the vehicle body. It would be advantageous to have design flexibility for mounting the motor and drive drum at a remote location in the vehicle body, i.e., remote from the window, such as below the vehicle occupant seating level, so as to reduce the likelihood of contact between the vehicle occupant and the motor in the event of dislocation.

It is an object of the present invention to provide motor vehicle window constructions having improved pull-pull cable drives for powered, laterally slidably panes. Additional objects and optional features of the invention will be apparent from the following disclosure and detailed discussion of preferred embodiments.

SUMMARY

In accordance with a first aspect a motor vehicle powered window construction has a glazing pane, typically a slider subassembly incorporating a transparent pane, which is slidably mounted in a circumferential frame. The slider subassembly is mounted for sliding laterally back and forth between an open position and a closed position. A pull-pull cable drive subassembly is provided for powered operation, that is, for moving the slider subassembly laterally back and forth between its open and closed positions. The pull-pull cable drive subassembly includes an electric motor and a drive drum operatively engaging the output member of the motor. The drive drum and motor apparatus is mounted to the vehicle body at a location remote from the window frame. Drive cable wrapped around the drive drum interconnects the remotely mounted drive apparatus to the slider subassembly. A first drive cable segment extends laterally from the slider subassembly toward one side of the frame and a second drive cable segment extends laterally from the slider subassembly toward the opposite side of the frame. Rotation of the remotely mounted drive drum in a first direction pulls the slider assembly via the first cable segment toward its open position, while rotation of the drive drum in the opposite rotational direction pulls the slider subassembly via the second cable segment toward its closed position. Thus, the slider subassembly is moved by a cable pull operation in both directions, the slider subassembly and drive cable together forming a closed loop from the drive drum.

The pull-pull cable arrangement disclosed here, wherein the drive cable pulls the slider subassembly or so-called slider pane in substantially the direction of travel, both when the window is being pulled open and when it is being pulled closed, provides excellent performance reliability and smoothness of operation. In addition, substantial advantage is achieved by mounting the electric motor and drive drum apparatus remote from the slider and window frame assembly. In particular, significant design flexibility is achieved in selecting the mounting location for the motor and drive drum apparatus. Since this apparatus typically has relatively high mass and rigidity, it can be advantageously mounted in accordance with the disclosure here, at a location where it is less likely to contact a vehicle occupant in the event of dislocation. Suitable cable guides, such as fixed surface and/or pulley-type cable guides can be provided to guide the drive cable in its travel path between the remotely located motor and drive drum apparatus and the slider. Accordingly, both enhanced design flexibility and excellent power window operation can be achieved. In accordance with another aspect, at least a section of the aforesaid first drive cable segment extends in a first channel in the frame, preferably in a lower horizontal portion of a circumferential frame member. Similarly, at least a section of the second drive cable segment extends in a second channel in the frame. Excellent functionality can be achieved in accordance with certain preferred embodiments, wherein at least a portion of such channels in the frame have a closed cross-sectional configuration, such as a tubular configuration. The circumferential frame member of such embodiments can be formed of molded plastic as a single unitary item, with open and/or closed cross-sectional configuration channels formed therein. Optionally, such cable channels are formed as uninterrupted continuations of a travel channel which slidingly receives the aforesaid slider subassembly. A generally centered, upwardly open slider travel channel in a lower horizontal portion of the frame can in this fashion be extended laterally in both directions by open or closed cross-section cable channels. In accordance with such preferred embodiments excellent functionality is achieved, such as cable protection, and/or good aesthetics in at least partially shielding the drive cable from view.

In accordance with another aspect, a multi-pane window construction is provided having at least one fixed-position pane mounted in the frame along with the slider subassembly as disclosed above. In accordance with certain preferred embodiments, the slider pane is mounted in the frame between right and left side fixed-position panes such that, in its open position, the slider pane overlaps one or the other of the fixed-position panes in a substantially parallel plane. In accordance with another aspect, the drive cable is of the cable type with an outer conduit. In certain preferred embodiments a first conduit end is secured to the frame at the location where the aforesaid first drive cable segment enters the corresponding cable channel in the frame. A second conduit end is secured to the frame where the second drive cable segment enters its corresponding cable channel in the frame. Opposite conduit ends of these two cable segments can be secured at the drive drum and electric motor apparatus, such that bare drive cable can be wrapped around the drive drum free of conduit. Preferably a cable directional block is mounted at each location where the drive cable enters the frame. Thus, a first cable directional block can be secured to the frame or, in alternative embodiments, to a fixed-position pane or the like. A socket or other means for securing (preferably releasably holding) the conduit end communicates with a passageway within the cable directional block for guiding the drive cable toward the corresponding cable channel leading to the slider pane. Similarly, a second cable directional block can be mounted on the opposite side of the slider pane, either to the frame or to another fixed-position pane, for securing the second conduit end and guiding the second drive cable segment.

In accordance with another aspect, a method is provided for retrofitting a manual-slide window construction in a motor vehicle body. That is, in a window construction having a manually slidably pane mounted in a circumferential frame, a pull-pull cable drive substantially as described above can be installed along with a remotely located electric motor and drive drum apparatus. Left and right cable fasteners are attached to the sliding pane. Left and right conduit attachment brackets are attached to the window construction remote from the sliding pane, such as to the frame or to fixed-position panes mounted in the frame, to the right and left of the sliding pane. The electric motor and drive drum apparatus is mounted to the motor vehicle remote from the frame and slider. The drive cable is mounted by (a) attaching the end of a first portion or segment of the conduit to the left conduit attachment bracket and attaching the end of the associated drive cable to the left cable fastener, and (b) attaching the conduit end of a second segment to the right conduit attachment bracket and attaching the end of the drive cable of such second segment to the right cable fastener. The manual-slide window construction is thereby retrofitted to operate as a pull-pull powered slider window construction wherein the sliding pane and drive cable together form a closed loop from the remotely mounted drive drum and electric motor apparatus. In accordance with certain preferred embodiments the left and right cable fasteners are formed at opposite ends of an elongate bracket which is adhesively attached to the inside surface of the sliding pane.

In accordance with another aspect, a retrofitting kit is provided for retrofitting a manual-slide window construction installed in a motor vehicle. Such retrofitting kit includes the aforesaid left and right cable fasteners for attachment to the sliding pane, left and right conduit attachment brackets for attachment to the window construction remote from the sliding pane, drive apparatus including an electric motor and drive drum suitable for mounting to the motor vehicle remote from the window construction and drive cable. The drive cable may comprise one or more separate cable lengths. Such kit typically would further comprise tensioning means for the conduit, an actuating switch for the motor and instructions for retrofitting a window construction installed originally as a manual-slide type window, in accordance with the retrofitting method disclosed above.

From the foregoing disclosure, it will be readily apparent to those skilled in the art, that is, to those who are knowledgeable or experienced in this area of technology, that the present invention provides a significant technological advance. As noted above, the pull-pull cable arrangement not only can provide excellent performance characteristics, especially in the context of a rear slider window construction for the cab of a pickup truck or the like, but also affords advantageous design flexibility with respect to remotely mounting the electric motor and drive drum apparatus. Moreover, the window construction disclosed here is well-suited to applications involving original motor vehicle installations and to applications involving retrofitting of a tear slider window construction installed originally as a manual-slide type window. An electric switch for electrically actuating the electric motor and drive drum apparatus to open and close the slider window can be conveniently located in the passenger compartment of the vehicle, thereby providing operational convenience to a driver of the vehicle. These and additional features and advantages of the invention disclosed here will be further understood from the following detailed disclosure of certain preferred embodiments.

BRIEF DESCRIPTION OF THE DRAWINGS

Certain preferred embodiments are described in detail below with reference to the appended drawings wherein.

Figure 1:
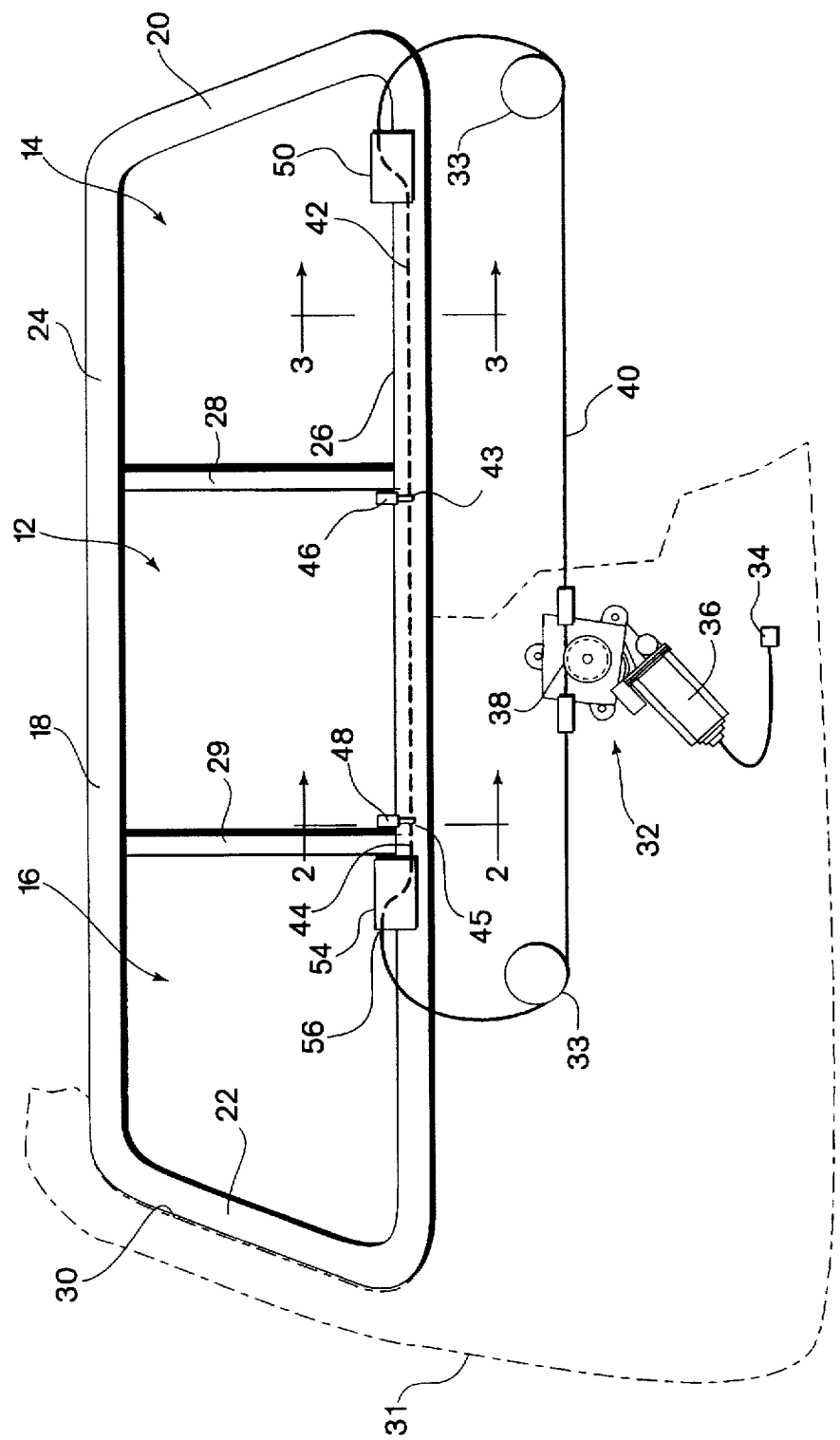
FIG. 1 is a schematic plan view of a multi-pane window construction suitable for use as the rear slider window in a pickup track cab or the like, incorporating a center slider pane mounted within a frame between right and left side fixed-position panes, a pull-pull drive cable arrangement and a motor with drive drum apparatus remotely mounted to a motor vehicle body in accordance with a first preferred embodiment.

The figures referred to above are not drawn necessarily to scale and should be understood to present a simplified representation of the invention, illustrative of the basic principles involved. The same reference numbers are used in the drawings for similar or identical components and features shown in various alternative embodiments. Window assemblies incorporating a slider pane as disclosed above, will have configurations and components determined, in part, by the intended application and use environment. Some features of the window construction depicted in the drawings have been enlarged or distorted relative to others to facilitate explanation and understanding.

DETAILED DESCRIPTION OF CERTAIN PREFERRED EMBODIMENTS

Unless otherwise stated, or otherwise clear from the context below, directional references used here are based on the orientation of components and assemblies shown in the appended drawings. The slider pane in window constructions disclosed here are laterally slidable in the sense that they slide horizontally and substantially in the plane of the slider pane. In window constructions having slider panes which are positioned flush with adjacent fixed-position panes, the slider pane may be slightly offset during initial lateral sliding movement, so as to clear the adjacent fixed-position pane as the slider pane moves to its open position. Reference to an inside surface of a window pane is intended to mean that surface which faces into the vehicle passenger compartment. The following detailed description of certain preferred embodiments will focus on window constructions adapted for use as a rear slider in a pickup truck cab. Those skilled in the art will recognize from this disclosure, however, that alternative applications are possible, such as motor vehicle side windows calling for a slider pane mounted within a frame for lateral sliding between an open and a closed position. In a side window application, such lateral sliding typically would involve fore-and-aft travel of the slider pane relative the vehicle body. Other suitable applications include, for example, a powered sliding sunroof in a motor vehicle.

The window construction schematically illustrated in FIG. 1 is a rear slider in a pickup truck cab, having a center mounted slider pane 12 positioned (in its closed position) between right side and left side fixed-position panes 14, 16, respectively. The slider pane and fixed position panes are mounted in a circumferential frame 18 having substantially vertical right and left portions 20, 22, respectively, interconnected by substantially horizontal upper and lower frame portions 24, 26, respectively. In addition, optional left and right mullions, i.e., vertical frame portions 28, 29 are positioned at the junction of the slider pane (again, in its closed position) with right side fixed position pane 14 and left side fixed position pane 16, respectively. The window construction is seated in a window opening 30 defined by vehicle body 31 at the rear of the passenger compartment. Thus, the window construction is oriented in a generally vertical plane. Suitable positioning means may be employed, such as a so-called halo molding, to facilitate the proper positioning of the window construction in the window opening 30. In this regard, the frame 18 is said to be circumferential in the sense that it forms a complete or substantially complete perimeter around the glazing panes. Preferably the frame integrates the window construction, such that the window construction is structural or semi-structural in the sense that it is sufficiently self-supporting as a preassembled self-contained module, to withstand stresses placed upon it during shipping, handling and installation into the motor vehicle window opening.

In accordance with current design preferences, the circumferential frame preferably includes at least one unitary full-circumference member extending all the way around the perimeter. Such full-circumference member can be formed by injection molding in-place around the fixed-position panes employing suitable plastics such as, for example, Geloy® which is commercially available from General Electric Company. Slider travel channels for guiding the sliding pane in its lateral movement between the open and closed positions can be molded into the frame and/or formed in whole or in part by separately attached channel members formed of metal, plastic, etc. The frame may further comprise appliques and the like to provide decorative "show" surfaces, that is, surfaces which will be exposed to view during normal use of the window construction when it is installed in the motor vehicle window opening. It will be within the ability of those skilled in the art, given the benefit of the present disclosure, to design and construct frames suitable to specific applications.

The window construction of FIG. 1 further comprises a pull-pull cable drive subassembly 32 for powering the slider pane between its opened and closed positions. Switch 34 for selectively actuating electric motor 36 is connected to the vehicle battery or other power source. Switch 34 can be mounted at any convenient location for use by vehicle occupants. A drive drum 38 is operatively engaged to an output member of motor 36, preferably being directly mounted onto a rotating output shaft of the motor. Drive cable 40 includes a first segment 42 extending to the left of slider pane 12 and a second segment 44 extending to the right from slider pane 12. More specifically, drive cable 40 has a first end 43 attached to an attachment block 46 at a first location on the transparent pane 12. As best seen in FIG. 1, such first location is the lower left corner of the slider pane 12. Similarly, cable 40 has a second end 45 attached to the slider block 48 at a second location on slider pane 12, the lower left corner of the slider pane. Typically, the slider pane will be a substantially quadrilateral transparent pane having a peripheral edge which includes a lower horizontal edge portion 50. In accordance with certain preferred embodiments the lower horizontal edge of the slider pane is substantially frameless other than the attachment blocks 46, 48 or other means provided there for guiding the transparent pane's travel between its open and closed positions. The slider subassembly incorporating the transparent slider pane may further comprise guide means along the upper horizontal peripheral edge for guiding travel, componentry of a latch or locking mechanism (typically, adhered to the inside surface 13 of the slider pane) and/or other devices suitable to the intended application of the window construction. Weather sealing can be provided about the perimeter of the sliding pane in accordance with known techniques including, for example, the use of blade seals and O-seals affixed to the frame 18, slider pane 12 and/or adjacent fixed-position panes 14, 16. Alternative sealing materials and techniques are well known and will be readily apparent to those skilled in the art for use in the present powered slider window constructions given the benefit of the present disclosure.

Figure 3:
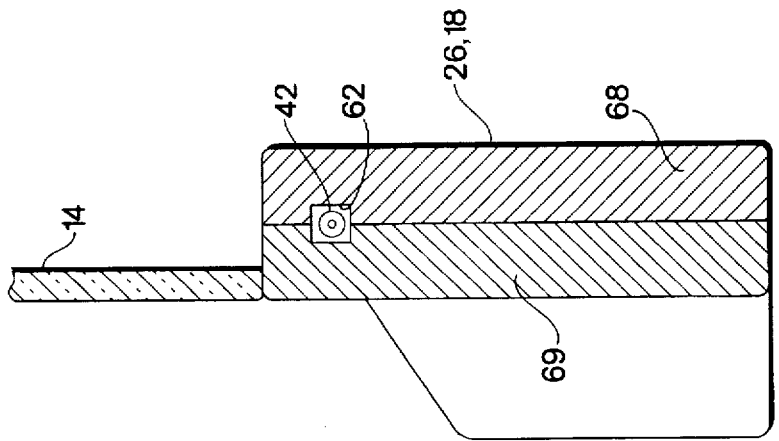
FIG. 3 is a cross-sectional view taken through line 3—3 of FIG. 1, showing a second segment of the drive cable extending in a cable channel formed in the lower horizontal portion of the window frame, the cable channel having a closed cross-sectional configuration.
Figure 5:
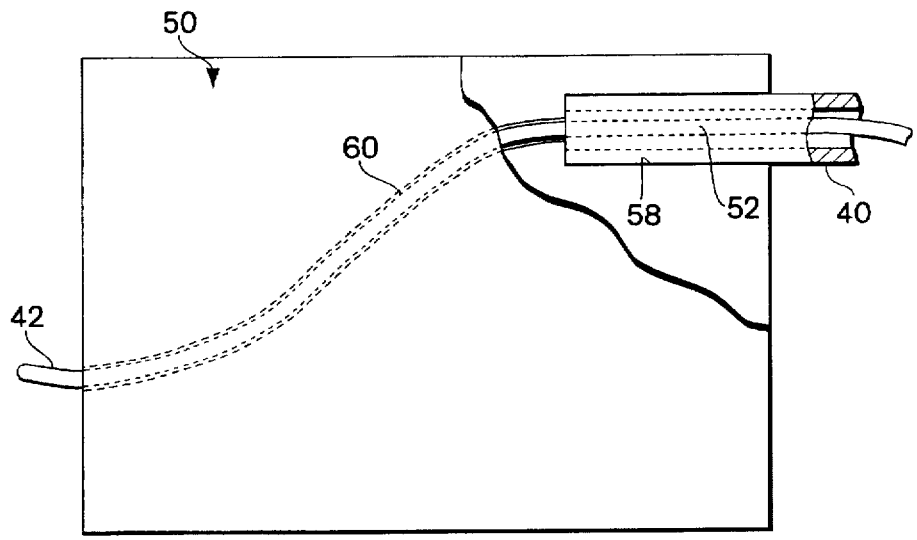
FIG. 5 is an enlarged perspective view, partially broken away, of the left side cable directional block attached to the horizontal lower portion of the window frame in the embodiment of FIG. 1.
Figure 6:
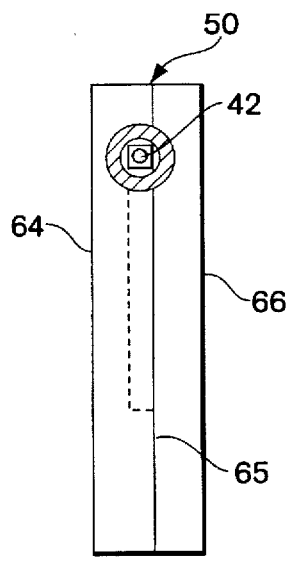
FIG. 6 is a partially cross-sectional elevation view taken through line 6—6 in FIG. 5.

Preferably, drive cable 40 is of the cable type having an outer sheath or conduit over at least a portion of the drive cable. In accordance with certain highly preferred embodiments, the left and right segments 42, 44 of drive cable 40 are attached to the horizontal lower portion of frame 18 by securing corresponding ends of the conduit thereto. It will be within the ability of those skilled in the art, given the benefit of the present disclosure, to employ suitable cable guide means, such as guides 33 shown in FIG. 1, for mounting and guiding the travel path of the drive cable from the remotely mounted motor and drive drum apparatus to the window frame. Also, tensioning means can be provided, for example, a standard threaded fitting positioned in-line with the conduit. As best seen in the enlarged illustrations of FIGS. 5 and 6, the embodiment of FIG. 1 comprises a cable directional block 50 which receives conduit end 52 of left side drive cable segment 42. Similarly, cable directional block 54 receives conduit end 56 of right side drive cable segment 44. The directional blocks can be affixed to the lower frame portion 26, optionally being unitary therewith, or can be affixed to the adjacent fixed-position panes. Since the left and right side cable directional blocks are substantially mirror images of each other, only left side block 50 will be described here in detail. Directional block 50 provides a socket 58 to receive and releasably hold conduit end 52 in position at the frame. A serpentine passageway 60 extends from socket 58, guiding drive cable 42 into proper alignment with a cable channel 62 (see FIG. 3) extending laterally within lower frame portion 26. A corresponding cable channel extends to the right of slider pane 12 to cable directional block 54. The cable directional blocks can be formed, for example, of molded plastic. For ease of manufacturing, as best seen in FIG. 6, the cable directional blocks can be made of a first piece 64 having serpentine passageway 60 formed in its surface 65, with a second piece 66 bonded or otherwise secured to surface 65. As seen in FIG. 3, internal cable channel 62 within lower frame portion 26 can be similarly formed by mating inner and outer frame components. Thus, in certain preferred embodiments, frame component 68 is provided as an applique onto frame component 69 which is a full-circumferential frame member. The resulting cable channel 62 is seen to have a closed cross-sectional configuration. That is, it is not upwardly open, for example, as is U-shaped slider travel channel 51 in the embodiment of FIG. 4, but rather is O-shaped (or has a square cross-sectional configuration, etc.) so as to protect and/or hide from view that portion of the drive cable which is within the cable channel.

Figure 2:
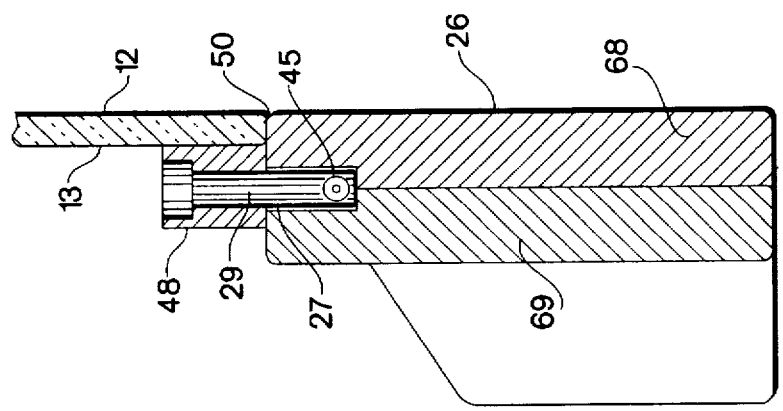
FIG. 2 is a cross-sectional view taken through line 2—2 of FIG. 1, showing attachment of a drive cable to the slider pane.

Lower frame portion 26 is seen to form a slider travel channel 27 (see FIG. 2) which receives a guide pin 29 extending downwardly from attachment block 48. A corresponding guide pin extends downwardly from the right-hand side attachment block 46, such that the slider pane is guided in its travel along the slider travel channel between its open and closed positions. The guide pins extending from the slider pane into slider travel channels optionally are spring-loaded or otherwise biased in the vertical direction to reduce or eliminate window rattle. This feature also advantageously facilitates the assembly and disassembly of the window construction by permitting the guide pins to be retracted for installing or removing the slider pane from the slider travel channels in the frame In accordance with certain preferred embodiments, the aforesaid closed cross-sectional configuration cable channels are lateral extensions of, and in axial alignment with, the upwardly open slider travel channel. The cable directional blocks or conduit attachment brackets discussed below, or equivalent cable mounting items, are secured to the frame or to fixed-position panes at locations laterally remote from the slider pane. That is, they are mounted not on or to the slider pane or slider subassembly, and rather are laterally spaced from the slider pane's entire travel range within the frame. The slider pane (or some part of the slider assembly) at its travel end points, that is, at the extreme ends of its travel range within the frame, optionally can contact the cable directional block or other such item and even use it as a travel stop to define an end point of its travel range. In any event, however, the entry points of the drive cable into the frame channels (or into the cable directional block or the like, if any) are laterally outward of the end points of the slider travel range.

Figure 4:
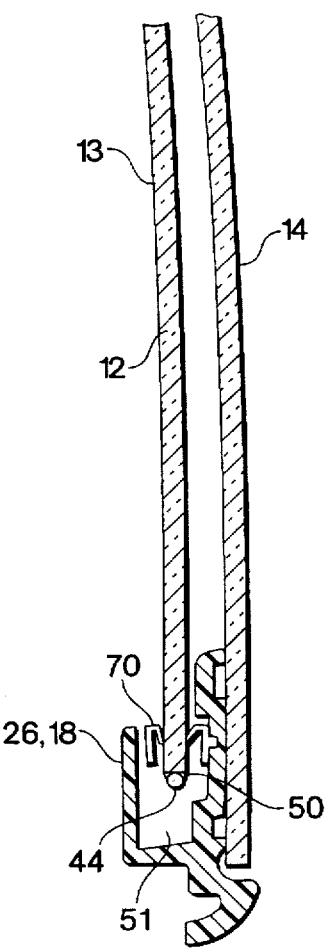
FIG. 4 is a schematic cross-sectional view corresponding to the view of FIG. 2 and illustrating an alternative embodiment for attachment of the drive cable to the slider pane.

Referring again to the embodiment of FIG. 4, an alternative means is illustrated there for attachment of the drive cable to the slider pane. In FIG. 4 the end of drive cable segment 44 is directly bonded to frameless lower peripheral edge 50 of slider pane 12. As noted above, lower frame portion 26 defines an upwardly open U-shaped slider travel channel 51 in the embodiment of FIG. 4, which slidingly receives the lower peripheral edge 50 of slider pane 12 along with the attached drive cable bonded thereto. Preferably, slider travel channel liners and/or seal members 70 are fitted into slider travel channel 51 for purposes of improved operation, sight shielding, etc.

Figure 7:
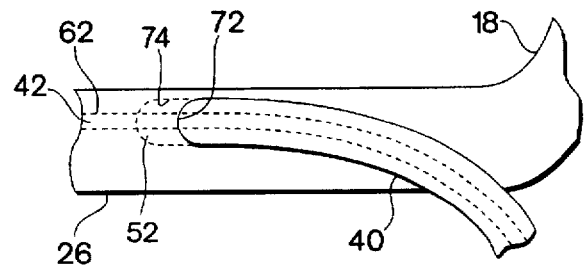
FIG. 7 is a schematic illustration, partially broken away, of an alternative preferred embodiment for entry of the drive cable into the window frame of the embodiment of FIG. 1.

Another alternative embodiment is illustrated in FIG. 7, wherein right side cable portion 42 enters lower frame portion 26 at an entry point 72. The frame 18 preferably forms a socket 74 to receive the end 52 of the conduit of cable segment 42. Conduit socket 74 communicates with cable channel 62 through which, as described above, the drive cable extends laterally to its connection with the slider pane. A corresponding arrangement for the cable entry point on the opposite side (that is, the left side) of the frame, can be provided in accordance with the same design principles described here for the right side entry point. It will be recognized that the conduit socket can be formed in accordance with well known and cost effective molding and milling techniques. In fact, such cable socket communicating with an associated cable channel can be provided in the frame even for manually operated window constructions, to facilitate retrofitting for powered operation at a later date after the window construction is installed in the motor vehicle. In accordance with the principles discussed above, the left and right cable entry points in accordance with the embodiment of FIG. 7 are laterally remote from the corresponding left and right end points of the slider pane lateral travel range.

In accordance with certain preferred embodiments, the window construction further includes a sensor to detect an obstruction encountered by the slider pane as it moves toward its closed or open position. Upon detecting an obstruction, the drive motor responds to a control signal initiated by the sensor to stop or reverse the travel direction of the slider pane. Such sensor can be provided as an electronic sensor incorporated into the electric motor to monitor the motor's amperage draw. In the preferred pull-pull cable arrangements described here, there is substantially constant load on the motor in both directions, that is, in the opening and closing direction of the slider pane during normal unobstructed operation. Hence, a sensor and associated actuator can be set to stop or reverse motor direction upon detecting amperage draw exceeding a preselected limit, for example, plus or minus 0.5 amps from a 2.0 amp design value. In this regard, it is a significant advantage of the pull-pull type and drum drive assembly disclosed here, that considerable drive force can be carried easily by the drive cable. The driving portion of the cable is always in tension, rather than being in compression when either opening or closing the sliding pane, as in a push-pull mechanism. Thus, the pull-pull arrangement disclosed here can be designed for constant load or force in both directions, with reduced concern for cable buckling limits.

Figure 8:
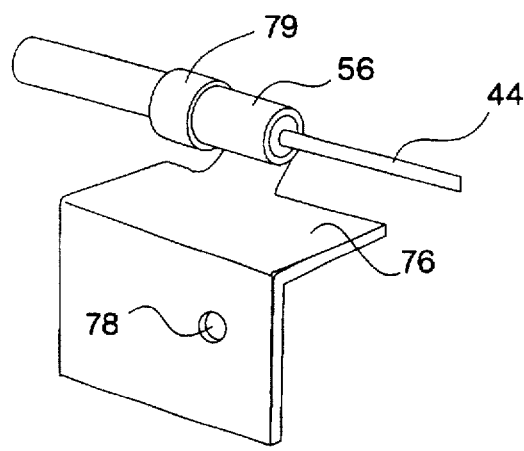
FIGS. 8–11 illustrate bracketry suitable for a retrofitting method and kit in accordance with a preferred embodiment for converting a manually operated slider pane to be power operated.
Figure 9:
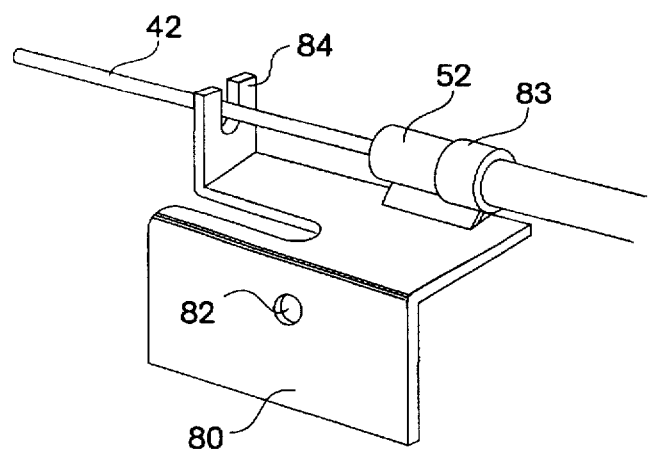

In accordance with the retrofitting method and apparatus aspects of the invention, bracketry and pull-pull cable drive componentry are provided for convening a manually operated slider window to a powered slider construction in accordance with the principles discussed above. Specifically, left side and right side conduit attachment brackets are provided for attachment to the frame and/or to fixed-position panes or the like of the window construction at locations laterally remote from the travel range of the slider pane. FIG. 8 illustrates a left side conduit attachment bracket suitable for mounting to the lower horizontal portion of the frame. Bracket 76 is seen to have a mounting hole 78 for receiving a mounting rivet, screw or, more preferably, a mating stud projecting from the surface of the frame. Optionally multiple mating studs can be provided for positioning and affixing the bracket 76 to the frame. Such mating studs can be formed during initial molding of the frame as unitary nubs or projections from the surface of the frame. Right side frame 80 is seen in FIG. 9 also to have a mounting hole 82 suitable for receiving a mating stud projecting from the frame. In the alternative, studs or nubs can be formed on the brackets to be received into corresponding sockets or holes in the surface of the frame at the mounting location. Left conduit attachment bracket 76 further comprises conduit flange 79 adapted to receive and releasably hold conduit end 56 of left side drive cable segment 44. Similarly, right conduit attachment bracket 80 has conduit flange 83 for receiving and releasably holding conduit end 52 associated with drive cable segment 42. In addition, drive cable guide 84 of bracket 80 serves to aid in guiding the drive cable from bracket 80 to its attachment to the slider pane.

Figure 10:
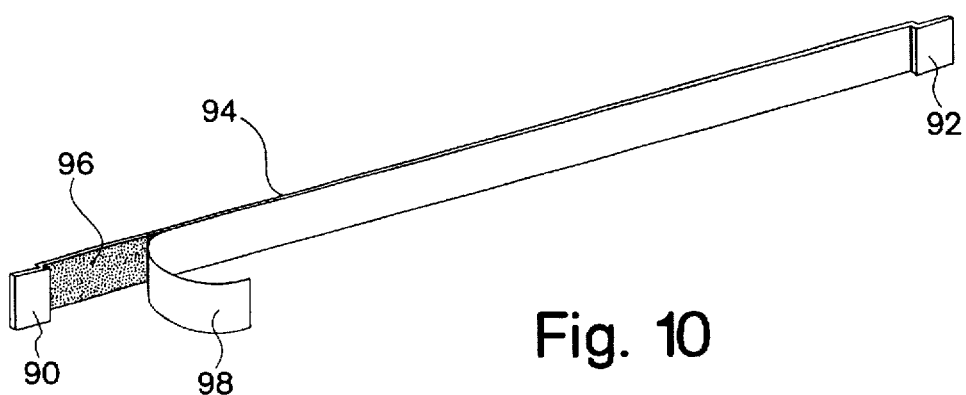
Figure 11:
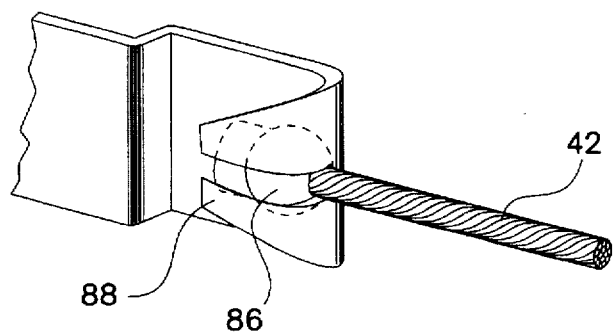
Figure 12:
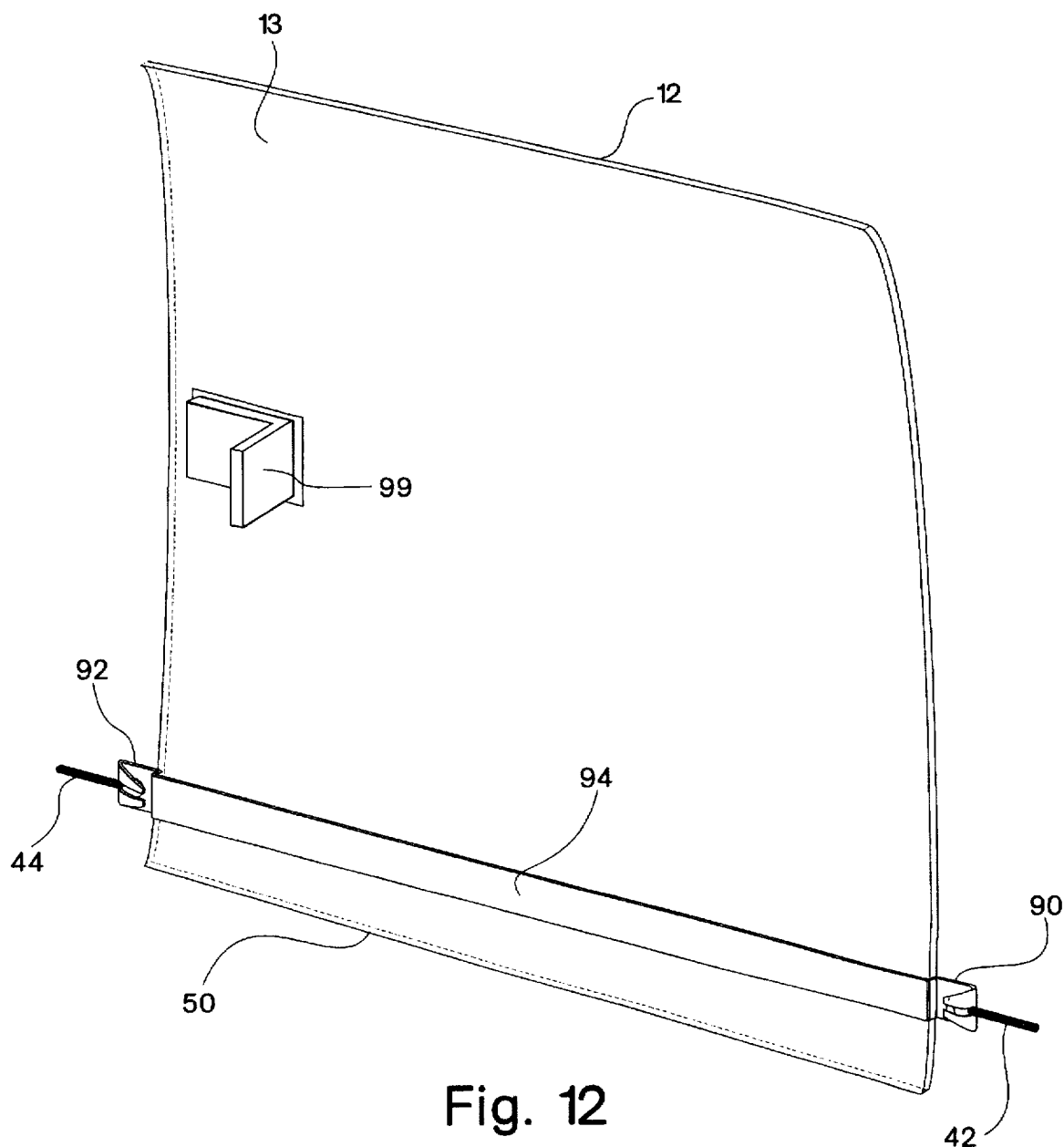
FIG. 12 is a schematic perspective view of a slider pane of a window construction which has been retrofitted for power operation.

Left and right cable fasteners are attached to the slider pane at locations laterally spaced from each other. Preferably, each end of the drive cable attached to the slider pane is fitted with a ball or lug in accordance with well known design techniques. Thus, as seen in FIG. 11, the end of drive cable segment 42 is fitted with lug 86. A corresponding lug would be fitted to the end of drive cable segment 44, extending to the slider pane from the left. A right cable fastener is illustrated in FIG. 11, having slotted flange 88 for receiving and releasably holding a cable end fitting, specifically, lug 86 at the end of drive cable segment 42. In accordance with one preferred embodiment, as illustrated in FIG. 10, left and right cable fasteners 90, 92, having the above described slotted flange design, are formed at opposite ends of an elongate bracket 94. Bracket 94 has an adhesive surface, specifically, offset surface 96 for adhesive attachment to a surface, preferably the inside surface of the slider pane. A removable film 98 is provided to protect the adhesive of surface 96 until such time as it is to be attached to the slider pane. FIG. 12 illustrates a slider pane 12 to which cable fastener bracket 94 has been attached. The end of right side drive cable segment 42 is attached to slotted flange cable fastener 90 in accordance with the embodiment illustrated in FIG. 11. Similarly, the end of right side drive cable segment 44 is attached to slotted flange cable fastener 92. It can be seen that elongate bracket 94 is attached to the slider pane 12 proximate its lower edge. Preferably, bracket 94 is attached at a height which corresponds generally to the cable height established by the conduit attachment brackets positioned on the frame to the left and right of the slider pane in accordance with the discussion above.

In addition to the retrofit bracketry and drive cable described above, retrofitting kits disclosed here, in accordance with preferred embodiments, further include drive apparatus comprising a drive motor and drive drum adapted for mounting to the motor vehicle body at a location remote from the window construction, preferably at a location below the seat level of the vehicle occupants. Preferably, such retrofitting kit further comprises installation instructions, templates and the like, to facilitate the retrofitting of a manually operated slider window to be power operated. Optionally, manual operation componentry, such as handle 99 attached to inside surface 13 of slider pane 12 in FIG. 12, can be removed in the course of the retrofitting.

In light of the foregoing disclosure of the invention and description of certain preferred embodiments, those who are skilled in this area of technology will readily understand that various modifications and adaptations can be made without departing from the true scope and spirit of the invention. All such modifications and adaptations are intended to be covered by the following claims.

We claim:

1. A motor vehicle window construction in a motor vehicle, comprising, in combination:

frame means mounted in a window recess in a vehicle body comprising a circumferential frame member with a first cable directional block integral with a lower horizontal portion of the frame member;

a slider subassembly comprising a transparent pane and being slidably mounted in the frame means for sliding laterally back and forth between a full open position and a closed position in a laterally extending slider travel channel in the lower horizontal portion of the frame member; and a pull-pull cable drive subassembly for moving the slider subassembly laterally back and forth between its full open and closed positions, the pull-pull cable drive subassembly comprising:

drive apparatus mounted to the vehicle body remote from the circumferential frame member, comprising a drive motor having an output member and a drive drum operatively engaging the output member for rotation upon actuation of the drive motor; and drive cable attached to the slider subassembly and wrapped around the drive drum for pulling the slider subassembly substantially laterally in a first direction toward its full open position upon rotation of the drive drum in a first rotational direction, and for pulling the slider subassembly substantially laterally in a second direction toward its closed position upon rotation of the drive drum in an opposite rotational direction, the slider subassembly and drive cable together forming a closed loop from the drive drum, with a first drive cable segment extending laterally from the slider subassembly toward a left side of the frame member and a second drive cable segment extending laterally from the slider subassembly toward a right side of the frame member;

wherein a section of the first drive cable segment extends in a first cable channel in the substantially horizontal lower portion of the frame member, and the first cable directional block forms a curved internal passageway guiding the drive cable from the first cable channel to a first entry point.

2. The motor vehicle window construction in accordance with claim 1 wherein at least a section of the second drive cable segment extends in a second cable channel in the lower portion of the frame member.

3. The motor vehicle window construction in accordance with claim 2 wherein at least a portion of the first and second channels has a closed cross-sectional configuration.

4. A multi-pane window construction in a motor vehicle, the window construction comprising, in combination:

frame means mounted in a window opening of a motor vehicle body, comprising a circumferential frame member having substantially vertical right and left portions interconnected by substantially horizontal upper and lower portions, with a first cable directional block integral with the lower horizontal portion of the frame member;

at least one fixed-position pane mounted in the frame means;

a slider subassembly comprising a transparent pane and being slidably mounted in the frame means for sliding laterally between a full open position and a closed position in a laterally extending slider travel channel in the lower horizontal portion of the frame member; and a pull-pull cable drive subassembly for moving the slider subassembly laterally back and forth between its full open position and closed position, the pull-pull cable drive subassembly comprising:

drive apparatus mounted to the motor vehicle body remote from the circumferential frame member, comprising a drive motor having an output member and a drive drum operatively engaging the output member for rotation upon actuation of the drive motor; and drive cable wrapped around the drive drum and having a first end attached to the slider subassembly at a first location and a second end attached to the slider subassembly at a second location remote from the first location, for pulling the slider subassembly substantially laterally in a first direction toward its full open position upon rotation of the drive drum in a first rotational direction and for pulling the slider subassembly substantially laterally in a second direction toward its closed position upon rotation of the drive drum in an opposite rotational direction, the slider subassembly and drive cable together forming a closed loop from the drive drum, with at least a first drive cable segment which extends from the drive drum to the slider subassembly at the first location being within a first cable channel and at least a second drive cable segment which extends from the drive drum to the slider subassembly at the second location being within a second cable channel, the first and second cable channels being formed at least in part by the lower portion of the circumferential frame member;

wherein a section of the first drive cable segment extends in a first cable channel in the substantially horizontal lower portion of the frame member, and the first cable directional block forms a curved internal passageway guiding the drive cable from the first cable channel to a first entry point, an outer conduit of the first drive cable segment having a first end secured to the drive apparatus and a second end secured to the first cable directional block at the first entry point.

5. The multi-pane window construction for a motor vehicle in accordance with claim 4 wherein the transparent pane is substantially quadrilateral, having a substantially frameless lower edge extending between first and second lower corners of the transparent pane, the lower edge being slidingly received in the laterally extending slider travel channel in the lower portion of the frame member, the first location being at the first lower corner of the transparent pane and the second location being at the second lower corner.

6. The multi-pane window construction for a motor vehicle in accordance with claim 5 further comprising (a) a first cable fastener fixedly attached to the transparent pane at the first lower corner and to the first end of the drive cable, and (b) a second cable fastener fixedly attached to the transparent pane at the second lower corner and to the second end of the drive cable.

7. The multi-pane window construction for a motor vehicle in accordance with claim 6 wherein at least one of the first and second cable fasteners is slidingly received in the slider travel channel when the slider subassembly is between its closed and full open positions.

8. The multi-pane window construction for a motor vehicle in accordance with claim 7 wherein the first and second cable fasteners each comprises a flange having a slot receiving the drive cable.

9. The multi-pane window construction for a motor vehicle in accordance with claim 5 wherein the first cable channel extends laterally in the lower portion of the frame member from a first lower corner of the frame member to the slider travel channel, and the second cable channel extends laterally in the lower portion of the frame member from a second lower corner of the frame member to the slider travel channel.

10. The multi-pane window construction for a motor vehicle in accordance with claim 5 wherein the slider subassembly is slidable in the slider travel channel between a first travel end point corresponding to the full open position and a second travel end point corresponding to the closed position, the first portion of the drive cable entering the first cable channel proximate the first travel end point.

11. The multi-pane window construction for a motor vehicle in accordance with claim 10 wherein the second segment of the drive cable enters the second cable channel proximate the second travel end point.

12. The multi-pane window construction for a motor vehicle in accordance with claim 10 wherein the first and second cable channels and the slider travel channel together form a continuous, laterally extending channel in the lower portion of the frame member.

13. The multi-pane window construction for a motor vehicle in accordance with claim 12 wherein the first and second cable channels each has at least a portion with a closed cross-sectional configuration within the lower portion of the frame member, and the slider travel channel has an upwardly open cross-sectional configuration.

14. The multi-pane window construction for a motor vehicle in accordance with claim 12 wherein the frame means further comprises a second cable directional block integral with the lower horizontal portion of the frame member and forming a curved internal passageway guiding the drive cable from the second cable channel to a second entry point, an outer conduit of the second drive cable segment having a first end secured to the drive apparatus and a second end secured to the second cable directional block at the second entry point.

15. The multi-pane window construction for a motor vehicle in accordance with claim 5 wherein the first end and the second end of the drive cable each is bonded directly to the substantially frameless bottom edge of the transparent pane.

16. A retrofitting kit for retrofitting a manual-slide window construction installed in a motor vehicle to be power operated, the window construction comprising a circumferential frame and a transparent pane slidably mounted in the frame for sliding laterally back and forth between an open position and a closed position, the transparent pane having an inside surface facing a passenger compartment of the motor vehicle body and a peripheral edge including a horizontal lower edge portion slidingly received in a laterally extending slider travel channel in a lower horizontal portion of the frame, the retrofitting kit comprising:

left and right cable fasteners for attachment to the transparent pane, each having a slotted flange for holding a drive cable end fitting;

left and right conduit attachment brackets for attachment to the window construction remote from the transparent pane each forming a curved internal passageway;

drive apparatus for mounting to the motor vehicle remote from the window construction, the drive apparatus comprising a drive motor having an output member and a drive drum operatively engaging the output member for rotation upon actuation of the drive motor; and drive cable in a conduit for operatively interconnecting the drive apparatus to the transparent pane for pull-pull powered opening and closing of the window construction by actuation of the drive motor for forward and reverse rotation of the drive drum, respectively, wherein (a) a first end of the conduit is attachable to the left conduit attachment bracket and a corresponding first drive cable end fitting being attachable to the left cable fastener, and (b) a second end of the conduit being attachable to the right conduit attachment bracket and a corresponding second drive cable end fitting being attachable to the right cable fastener.

17. The retrofitting kit in accordance with claim 16 for retrofitting a manual-slide window construction installed in a motor vehicle, wherein the left and right conduit attachment brackets have mating stud and hole configurations with the lower horizontal portion of the frame.

18. The retrofitting kit in accordance with claim 16 for retrofitting a manual-slide window construction installed in a motor vehicle, wherein the left and right conduit attachment brackets are affixed to left and right fixed panes, respectively, mounted in the frame member to the left and right, respectively, of the transparent pane.

19. The retrofitting kit in accordance with claim 16 for retrofitting a manual-slide window construction installed in a motor vehicle, wherein the left and right cable fasteners are at opposite ends of an elongate bracket having an adhesive surface covered by a removable protective film.

20. The retrofitting kit in accordance with claim 16 for retrofitting a manual-slide window construction installed in a motor vehicle, further comprising an electrical switch suitable for mounting in the motor vehicle remote from the window construction and from the drive apparatus.

21. A window construction installed in a window opening of a motor vehicle body, comprising:

a circumferential frame and a transparent pane slidably mounted in the frame for sliding laterally back and forth between an open position and a closed position, the transparent pane having an inside surface facing a passenger compartment of the motor vehicle body and a peripheral edge including a horizontal lower edge portion slidingly received in a laterally extending slider travel channel in a lower horizontal portion of the frame;

a left conduit attachment bracket mounted to the window construction to the left of, and remote from, the transparent pane and a right conduit attachment bracket mounted to the window construction to the right of, and remote from, the transparent pane each conduit forming a curved internal passageway;

an elongate bracket adhesively bonded to an inside surface of the transparent pane substantially parallel the lower horizontal edge, having a left cable fastener at a left edge of the transparent pane and a right cable fastener at a right cable edge of the transparent pane;

drive apparatus mounted to the motor vehicle remote from the circumferential frame, comprising a drive motor having an output member and a drive drum operatively engaging the output member for rotation upon actuation of the drive motor; and drive cable in a conduit operatively interconnecting the drive apparatus to the transparent pane for pull-pull powered opening and closing of the window construction by actuation of the drive motor for forward and reverse rotation of the drive drum, respectively, the first end of the conduit being attached to the left conduit attachment bracket and a second end of the conduit being attached to the right conduit attachment bracket, a first end of the drive cable being attached to the left cable fastener and a second end of the drive cable being attached to the right cable fastener, the drive cable and transparent pane together forming a closed loop from the drive drum.

22. The window construction in accordance with claim 21 installed in a motor vehicle, wherein the left and right conduit attachment brackets and the lower horizontal portion of the frame having mating stud and hole configurations.

23. A window construction in accordance with claim 21 installed in a motor vehicle, wherein the left and right conduit attachment brackets are affixed to left and right fixed panes, respectively, mounted in the frame member to the left and right, respectively, of the transparent pane.

24. The window construction in accordance with claim 21 installed in a motor vehicle, further comprising an electrical switch suitable for mounting in the motor vehicle remote from the circumferential frame member and from the drive apparatus.

25. The motor vehicle window construction of claim 1 wherein an outer conduit of the first drive cable segment has a first end secured to the drive apparatus and a second end secured to the first cable directional block at the first entry point.

26. A motor vehicle window construction in a motor vehicle, comprising, in combination:

frame means for mounting mounted in a window recess in the a vehicle body comprising a circumferential frame member with a first cable directional block contacting a lower horizontal portion of the frame member;

a slider subassembly comprising a transparent pane and being slidably mounted in the frame means for sliding laterally back and forth between a full open position and a closed position in a laterally extending slider travel channel in the lower horizontal portion of the frame member; and a pull-pull cable drive subassembly for moving the slider subassembly laterally back and forth between its full open and closed positions, the pull-pull cable drive subassembly comprising:

drive apparatus mounted to the vehicle body remote from the circumferential frame member, comprising a drive motor having an output member and a drive drum operatively engaging the output member for rotation upon actuation of the drive motor; and drive cable attached to the slider subassembly and wrapped around the drive drum for pulling the slider subassembly substantially laterally in a first direction toward its full open position upon rotation of the drive drum in a first rotational direction, and for pulling the slider subassembly substantially laterally in a second direction toward its closed position upon rotation of the drive drum in an opposite rotational direction, the slider subassembly and drive cable together forming a closed loop from the drive drum, with a first drive cable segment extending laterally from the slider subassembly toward a left side of the frame member and a second drive cable segment extending laterally from the slider subassembly toward a right side of the frame member;

wherein a section of the first drive cable segment extends in a first cable channel in the substantially horizontal lower portion of the frame member, and the first cable directional block forms a curved internal passageway guiding the drive cable from the first cable channel to a first entry point.

27. The multi-pane window construction for a motor vehicle in accordance with claim 26 wherein at least one fixed-position pane is mounted in the frame means laterally to the right of the slider subassembly and a second fixed-position pane is mounted in the frame means laterally to the left of the slider subassembly, the first cable directional block being affixed to the one fixed-position pane proximate the lower horizontal portion of the frame member and a second cable directional block being affixed to the second fixed-position pane proximate the lower horizontal portion of the frame member.

* * * * *

UNITED STATES PATENT AND TRADEMARK OFFICE
CERTIFICATE OF CORRECTION

PATENT NO. : 5,724,769
DATED : Mar. 10, 1998
INVENTOR(S) : Cripe et al.

It is certified that error appears in the above-identified patent and that said Letters Patent is hereby corrected as shown below:

The title page should be deleted to appear as per attached title page.

Signed and Sealed this

Fifteenth Day of December, 1998

Attest:

*Attesting Officer*

BRUCE LEHMAN
*Commissioner of Patents and Trademarks*

United States Patent
Cripe et al.

Patent Number: 5,724,769
Date of Patent: Mar. 10, 1998

[54] MOTOR VEHICLE WINDOW CONSTRUCTION WITH PULL-PULL CABLE SYSTEM

[75] Inventors: Todd E. Cripe, Elkhart, Ind.; Darren M. Grumm, Cassopolis, Mich.; Raymond S. Butler, Elkhart, Ind.; Roger E. Schamanek, Rochester Hills; Dennis J. Buening, Waterford, both of Mich.

[73] Assignee: Excel Industries, Inc., Elkhart, Ind.

[21] Appl. No.: 624,130

[22] Filed: Mar. 29, 1996

Related U.S. Application Data

[63] Continuation-in-part of Ser. No. 369,345, Jan. 6, 1995, Pat. No. 5,542,214.

[51] Int. Cl.⁶ .................................................. E05F 11/53
[52] U.S. Cl. ........................... 49/360; 49/352; 49/380; 49/121
[58] Field of Search .......................... 49/331, 332, 347, 49/349, 352, 360, 139, 140, 118, 380, 121

[56] References Cited

U.S. PATENT DOCUMENTS

| Number | Date | Inventor | Class |
|---|---|---|---|
| 4,608,778 | 9/1986 | Shiraishi et al. | 49/360 |
| 4,793,099 | 12/1988 | Friese et al. | 49/380 |
| 4,920,698 | 5/1990 | Friese et al. | 49/380 |
| 4,941,286 | 7/1990 | Marscholl et al. | 49/352 |
| 4,970,911 | 11/1990 | Ujihara et al. | 49/352 |
| 5,146,712 | 9/1992 | Hlavaty | 49/118 |
| 5,333,411 | 8/1994 | Tschirschwitz et al. | 49/360 |
| 5,442,880 | 8/1995 | Gipson | 49/380 |
| 5,505,023 | 4/1996 | Gillen et al. | 49/360 |
| 5,531,046 | 7/1996 | Kollar et al. | 49/360 |
| 5,542,214 | 8/1996 | Buening | 49/360 |
| 5,613,323 | 3/1997 | Buening | 49/360 |

*Primary Examiner*—Jerry Redman
*Assistant Examiner*—Curtis Cohen
*Attorney, Agent, or Firm*—Banner & Witcoff, Ltd.

[57] ABSTRACT

A motor vehicle window construction has a pull-pull closed loop cable drive system for opening and closing a glazing pane slidably mounted in a frame. A motor and drive drum apparatus for powered operation of the window construction is mounted to the vehicle body at a location remote from the frame. The cable system includes drive cable wrapped around the drive drum. A first drive cable segment extends laterally from the glazing pane or from a slidably mounted subassembly incorporating the glazing pane, toward one side of the frame member. A second drive cable segment extends from the glazing pane or subassembly toward the opposite side of the frame. The glazing pane and drive cable together form a closed loop from the drive drum. Rotating of the drive drum in a first rotational direction by actuation of the drive motor pulls the slidably mounted transparent pane toward its open position. Rotating the drive drum in the opposite rotational direction pulls the glazing pane toward its closed position. A method also is provided for retrofitting a manual-slide window construction preinstalled in a motor vehicle body to be a powered slide window as just described. A retrofitting kit is provided for carrying out such retrofitting method.

27 Claims, 6 Drawing Sheets

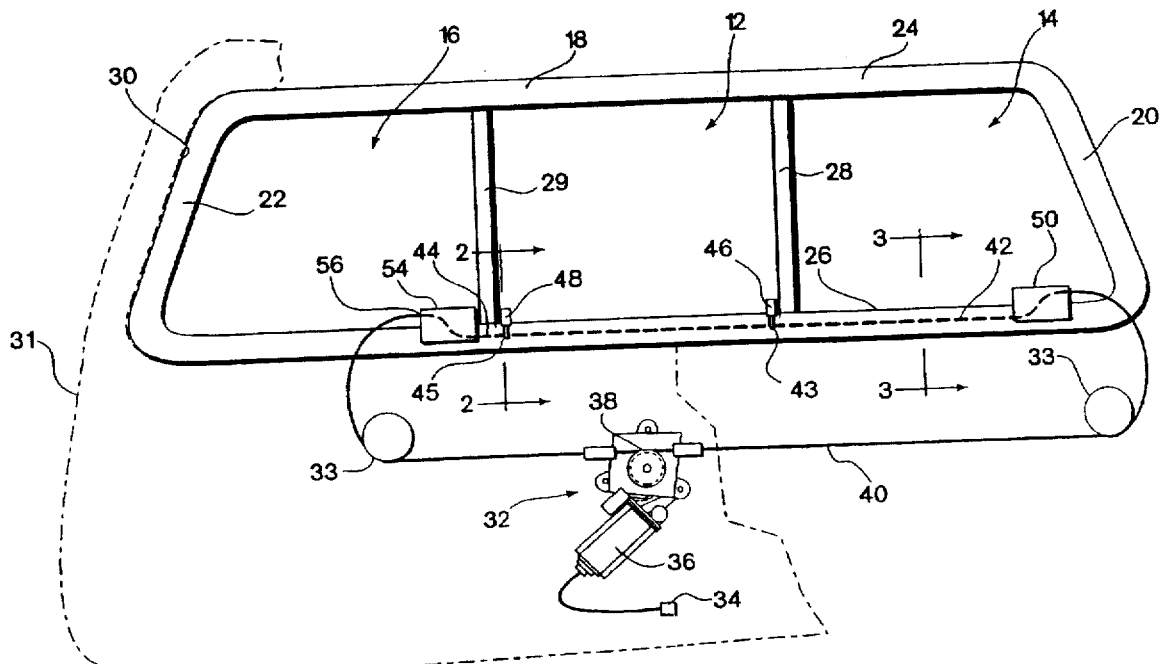

(12) EX PARTE REEXAMINATION CERTIFICATE (8102nd)
United States Patent
Cripe et al.

(10) Number: US 5,724,769 C1
(45) Certificate Issued: Mar. 22, 2011

(54) MOTOR VEHICLE WINDOW CONSTRUCTION WITH PULL-PULL CABLE SYSTEM

(75) Inventors: Todd E. Cripe, Elkhart, IN (US); Darren M. Grumm, Cassopolis, MI (US); Raymond S. Butler, Elkhart, IN (US); Roger E. Schamanek, Rochester Hills, MI (US); Dennis J. Buening, Waterford, MI (US)

(73) Assignee: General Electric Capital Corporation, Chicago, IL (US)

Reexamination Request:
No. 90/009,621, Oct. 29, 2009

Reexamination Certificate for:
Patent No.: 5,724,769
Issued: Mar. 10, 1998
Appl. No.: 08/624,130
Filed: Mar. 29, 1996

Certificate of Correction issued Dec. 15, 1998.

Related U.S. Application Data

(63) Continuation of application No. 08/369,345, filed on Jan. 6, 1995, now Pat. No. 5,542,214.

(51) Int. Cl.
*E05F 11/53* (2006.01)

(52) U.S. Cl. ............................. 49/360; 49/352; 49/380; 49/121

(58) Field of Classification Search ........................ None
See application file for complete search history.

(56) References Cited

U.S. PATENT DOCUMENTS

| | | |
|---|---|---|
| 1,199,868 A | 10/1916 | Browne |
| 1,763,603 A | 6/1930 | Donahue |
| 1,809,132 A | 6/1931 | Martin |
| 2,282,980 A | 5/1941 | Guy |
| 2,566,745 A | 9/1951 | Parsons |
| 2,597,539 A | 5/1952 | Smart |
| 2,701,162 A | 2/1955 | Kliger |
| 2,701,631 A | 2/1955 | Stouder et al. |
| 2,721,361 A | 10/1955 | Ryan et al. |
| 2,721,636 A | 10/1955 | Ordorica et al. |

(Continued)

FOREIGN PATENT DOCUMENTS

| | | |
|---|---|---|
| BE | 358158 | 2/1928 |
| DE | 2039313 | 5/1971 |
| DE | 3118559 A1 | 11/1982 |
| EP | 0037097 | 3/1981 |
| EP | 0449372 A2 | 3/1991 |
| EP | 0529815 A1 | 7/1992 |
| EP | 0646483 A1 | 9/1994 |
| FR | 709660 | 5/1931 |
| FR | 2552483 | 9/1983 |
| JP | 01-21928 | 9/1989 |
| JP | 1219280 | 9/1989 |

*Primary Examiner*—Joseph A. Kaufman

(57) ABSTRACT

A motor vehicle window construction has a pull-pull closed loop cable drive system for opening and closing a glazing pane slidably mounted in a frame. A motor and drive drum apparatus for powered operation of the window construction is mounted to the vehicle body at a location remote from the frame. The cable system includes drive cable wrapped around the drive drum. A first drive cable segment extends laterally from the glazing pane or from a slidably mounted subassembly incorporating the glazing pane, toward one side of the frame member. A second drive cable segment extends from the glazing pane or subassembly toward the opposite side of the frame. The glazing pane and drive cable together form a closed loop from the drive drum. Rotating of the drive drum in a first rotational direction by actuation of the drive motor pulls the slidably mounted transparent pane toward its open position. Rotating the drive drum in the opposite rotational direction pulls the glazing pane toward its closed position. A method also is provided for retrofitting a manual-slide window construction preinstalled in a motor vehicle body to be a powered slide window as just described. A retrofitting kit is provided for carrying out such retrofitting method.

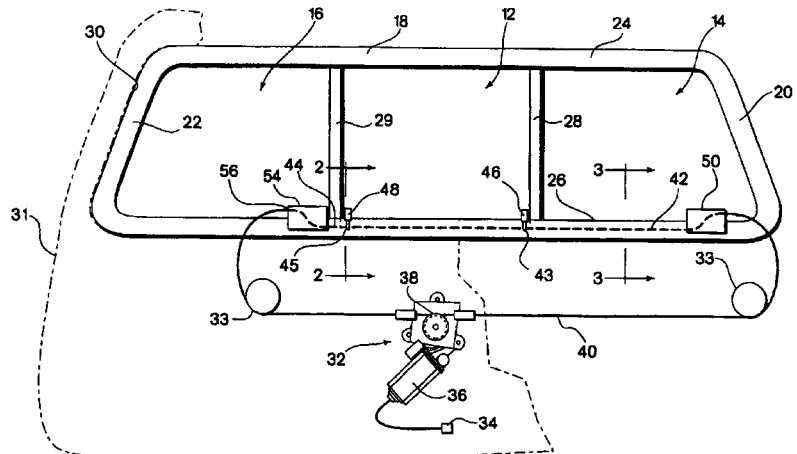

U.S. PATENT DOCUMENTS

| | | |
|---|---|---|
| 2,770,312 A | 11/1956 | Silverman |
| 2,781,835 A | 2/1957 | Westman |
| 2,836,457 A | 5/1958 | Beerman et al. |
| 2,894,784 A | 7/1959 | Howard |
| 2,946,098 A | 7/1960 | Migneault et al. |
| 3,134,112 A | 5/1964 | Hage |
| 3,155,204 A | 11/1964 | Campbell et al. |
| 3,237,250 A | 3/1966 | Scoville |
| 3,274,740 A | 9/1966 | Hall |
| 3,332,169 A | 7/1967 | Lohr et al. |
| 3,333,362 A | 8/1967 | Kostin et al. |
| 3,376,670 A | 4/1968 | Jones |
| 3,384,997 A | 5/1968 | Heeter |
| 3,440,765 A | 4/1969 | Eskra et al. |
| 3,440,892 A | 4/1969 | Eskra |
| 3,468,738 A | 9/1969 | Deisenroth |
| 3,478,475 A | 11/1969 | Strack |
| 3,635,100 A | 1/1972 | Littmann |
| 3,759,004 A | 9/1973 | Kent |
| 3,770,312 A | 11/1973 | Shadburn |
| 3,774,363 A | 11/1973 | Kent |
| 3,808,742 A | 5/1974 | Ehret et al. |
| 3,893,260 A | 7/1975 | Cadiou |
| 3,893,261 A | 7/1975 | Cribben |
| 3,900,965 A | 8/1975 | Mummert |
| 3,967,424 A | 7/1976 | Gates |
| 4,072,340 A | 2/1978 | Morgan |
| 4,081,926 A | 4/1978 | Jardin |
| 4,093,304 A | 6/1978 | Ziegler |
| 4,106,239 A | 8/1978 | Bancroft et al. |
| 4,119,341 A | 10/1978 | Cook |
| 4,124,054 A | 11/1978 | Spretnjak |
| 4,139,234 A | 2/1979 | Morgan |
| 4,157,634 A | 6/1979 | Coulston |
| 4,158,270 A | 6/1979 | Cherbourg et al. |
| 4,170,847 A | 10/1979 | Pickles |
| 4,171,594 A | 10/1979 | Colanzi |
| 4,235,117 A | 11/1980 | Pickles |
| 4,317,312 A | 3/1982 | Heideman |
| 4,387,923 A | 6/1983 | Choby et al. |
| 4,389,818 A | 6/1983 | Sakamoto |
| 4,396,221 A | 8/1983 | Morgan et al. |
| 4,407,093 A | 10/1983 | Spretnjak et al. |
| 4,419,844 A | 12/1983 | Kreisfeld |
| 4,502,248 A | 3/1985 | Thomas, Jr. et al. |
| 4,543,747 A | 10/1985 | Kaltz et al. |
| 4,571,278 A | 2/1986 | Kunert |
| 4,591,204 A | 5/1986 | Gallitzendoerfer et al. |
| 4,606,159 A | 8/1986 | Kunert |
| 4,608,778 A | 9/1986 | Shiraishi et al. |
| 4,635,398 A | 1/1987 | Nakamura |
| 4,660,325 A | 4/1987 | Bauer et al. |
| 4,671,013 A | 6/1987 | Friese et al. |
| 4,674,231 A | 6/1987 | Radek et al. |
| 4,700,525 A | 10/1987 | Nieboer et al. |
| 4,703,099 A | 10/1987 | Regelman |
| 4,723,809 A | 2/1988 | Kida et al. |
| 4,738,052 A | 4/1988 | Yoshida |
| 4,756,767 A | 7/1988 | Soni et al. |
| 4,785,583 A | 11/1988 | Kawagoe et al. |
| 4,793,099 A | 12/1988 | Friese et al. |
| 4,819,377 A | 4/1989 | Bauer et al. |
| 4,823,512 A | 4/1989 | Maekawa et al. |
| 4,835,907 A | 6/1989 | Heuchert |
| 4,858,988 A | 8/1989 | Morgan et al. |
| 4,889,175 A | 12/1989 | Frey et al. |
| 4,920,698 A | 5/1990 | Friese et al. |
| 4,934,098 A | 6/1990 | Prouteau et al. |
| 4,941,286 A | 7/1990 | Marscholl et al. |
| 4,970,911 A | 11/1990 | Ujihara et al. |
| 4,995,195 A | 2/1991 | Olberding et al. |
| 5,005,317 A | 4/1991 | Saint-Louis Augustin et al. |
| 5,007,201 A | 4/1991 | D'Hoore et al. |
| 5,028,082 A | 7/1991 | Kronbetter |
| 5,042,855 A | 8/1991 | Bennett et al. |
| 5,046,283 A | 9/1991 | Compeau et al. |
| 5,054,242 A | 10/1991 | Keys et al. |
| RE33,741 E | 11/1991 | Boissevain |
| 5,099,611 A | 3/1992 | Kracht et al. |
| 5,131,349 A | 7/1992 | Keller et al. |
| 5,146,712 A | 9/1992 | Hlavaty |
| 5,154,028 A | 10/1992 | Hill et al. |
| 5,161,419 A | 11/1992 | Moy et al. |
| 5,171,051 A | 12/1992 | Yada |
| 5,217,786 A | 6/1993 | Keys |
| 5,228,740 A | 7/1993 | Saltzman |
| 5,236,650 A | 8/1993 | Choby et al. |
| 5,245,788 A | 9/1993 | Riegelman |
| 5,294,168 A | 3/1994 | Kronbetter |
| 5,333,411 A | 8/1994 | Tschirschwitz et al. |
| 5,345,717 A | 9/1994 | Mori et al. |
| 5,398,449 A | 3/1995 | Kobrehel et al. |
| 5,442,880 A | 8/1995 | Gipson |
| 5,443,673 A | 8/1995 | Fisher et al. |
| 5,451,090 A | 9/1995 | Brodie et al. |
| 5,467,560 A | 11/1995 | Camp et al. |
| 5,473,840 A | 12/1995 | Gillen et al. |
| 5,505,023 A | 4/1996 | Gillen et al. |
| 5,522,191 A | 6/1996 | Wenner et al. |
| 5,531,046 A | 7/1996 | Kollar et al. |
| 5,537,782 A | 7/1996 | Klippert et al. |
| 5,542,214 A | 8/1996 | Buening |
| 5,544,458 A | 8/1996 | Fisher et al. |
| 5,551,193 A | 9/1996 | Barnett |
| 5,591,528 A | 1/1997 | Fisher et al. |
| 5,595,025 A | 1/1997 | MacPhail-Fausey |
| 5,611,180 A | 3/1997 | Agrawal et al. |
| 5,613,322 A | 3/1997 | Kobrehel |
| 5,613,323 A | 3/1997 | Buening |
| 5,613,325 A | 3/1997 | Mariel |
| 5,617,675 A | 4/1997 | Kobrehel |
| 5,623,785 A | 4/1997 | Mariel |
| 5,647,094 A | 7/1997 | Mariel |
| 5,657,580 A | 8/1997 | Kobrehel |
| 5,669,181 A | 9/1997 | Kollar et al. |
| 5,724,771 A | 3/1998 | Gipson |
| 5,749,174 A | 5/1998 | Mariel |
| 5,775,029 A | 7/1998 | Buening |
| 5,787,643 A | 8/1998 | Schmuck |
| 5,799,444 A | 9/1998 | Freimark et al. |
| 5,804,018 A | 9/1998 | Fisher et al. |
| 5,822,922 A | 10/1998 | Grumm et al. |
| 5,836,110 A | 11/1998 | Buening |
| 5,864,987 A | 2/1999 | Mariel et al. |
| 5,864,996 A | 2/1999 | Veldman et al. |
| 5,941,022 A | 8/1999 | Schmuck |
| 5,996,284 A | 12/1999 | Freimark et al. |
| 7,073,293 B2 | 7/2006 | Galer |

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 1-14, 16, 18, 20, 21 and 23-27 is confirmed.

New claim 28-31 are added and determined to be patentable.

Claims 15, 17, 19 and 22 were not reexamined.

*28. The motor vehicle window construction of claim 1 wherein the frame means further comprising substantially vertical right and left portions interconnected by the upper and lower portions, and right and left side fixed-position panes each mounted in the frame means, and wherein the first cable channel is a portion of the slider travel channel.*

*29. The motor vehicle window construction of claim 21 wherein the transparent pane is not opaque.*

*30. The window construction of claim 21 wherein the left and right conduit attachment bracket each pass a cable from an upper position outside of the channel to a lower position in the channel.*

*31. The window assembly of claim 30 wherein the left and right conduit attachment bracket each include a guide channel for guiding the cable from a position above the channel to a position in the channel.*

* * * * *